US011535116B1

(12) United States Patent
Heidary

(10) Patent No.: US 11,535,116 B1
(45) Date of Patent: Dec. 27, 2022

(54) CHARGING SYSTEM FOR AN ELECTRIC VEHICLE

(71) Applicant: Massoud Mike Heidary, Gaithersburg, MD (US)

(72) Inventor: Massoud Mike Heidary, Gaithersburg, MD (US)

( * ) Notice: Subject to any disclaimer, the term of this patent is extended or adjusted under 35 U.S.C. 154(b) by 0 days.

(21) Appl. No.: 17/300,645

(22) Filed: Sep. 13, 2021

(51) Int. Cl.
| | | |
|---|---|---|
| *H02J 7/00* | (2006.01) | |
| *H02J 7/14* | (2006.01) | |
| *B60L 53/66* | (2019.01) | |
| *B60L 50/60* | (2019.01) | |
| *B60L 53/16* | (2019.01) | |
| *B60L 53/18* | (2019.01) | |
| *B60L 53/62* | (2019.01) | |
| *B60L 53/65* | (2019.01) | |
| *B60L 53/30* | (2019.01) | |
| *B60L 58/12* | (2019.01) | |

(52) U.S. Cl.
CPC ............ *B60L 53/665* (2019.02); *B60L 50/60* (2019.02); *B60L 53/16* (2019.02); *B60L 53/18* (2019.02); *B60L 53/305* (2019.02); *B60L 53/62* (2019.02); *B60L 53/65* (2019.02); *B60L 58/12* (2019.02); *H02J 7/00032* (2020.01); *H02J 7/0042* (2013.01); *H02J 7/0047* (2013.01); *H02J 7/00712* (2020.01)

(58) Field of Classification Search
CPC ...... B60L 53/665; B60L 53/62; B60L 53/305; B60L 53/16; B60L 53/18; B60L 53/65; B60L 50/60; H02J 7/00032; H02J 7/00712

USPC ......................................................... 320/104
See application file for complete search history.

(56) References Cited

U.S. PATENT DOCUMENTS

| | | | | |
|---|---|---|---|---|
| 2004/0104814 A1* | 6/2004 | Christensen | ............ | B60L 53/65 340/426.16 |
| 2012/0153894 A1* | 6/2012 | Widmer | ................ | H02J 7/0042 320/108 |
| 2012/0274275 A1* | 11/2012 | Baek | ......................... | H02J 7/02 320/109 |
| 2012/0280653 A1* | 11/2012 | Prosser | ................. | B60L 53/665 320/109 |
| 2013/0166136 A1* | 6/2013 | Park | ....................... | H04B 3/548 701/31.4 |
| 2013/0289821 A1* | 10/2013 | Nakagawa | ............ | B60L 3/0046 701/1 |
| 2014/0266004 A1* | 9/2014 | Andrews, Jr. | ........... | B60L 53/36 320/108 |

(Continued)

*Primary Examiner* — Alexis B Pacheco

(57) ABSTRACT

An Electric Vehicle (EV) charging system and method is disclosed. The system includes EV with a battery, charge control device, a portable transponder, a charging station with energy management device, a cable, a transmitter. The vehicle ID and SoC information is received from the vehicle, and the information is transmitted to the internet server along with charging station ID. The portable transponder is registered with the internet server which includes transponder ID and associated vehicles or vehicle IDs. Once the request for payment authorization is received from the charging station by the server, the server verifies the information and approves or denies the request. Upon approval of the request, the charging can commence. The portable transponder can be used for charging a second vehicle, as long as the second vehicle is also registered with the server.

6 Claims, 4 Drawing Sheets

(56) References Cited

U.S. PATENT DOCUMENTS

| | | | |
|---|---|---|---|
| 2014/0266006 A1* | 9/2014 | Luke | B60L 53/63 |
| | | | 320/106 |
| 2016/0071339 A1* | 3/2016 | Yuasa | G01R 31/382 |
| | | | 340/636.16 |
| 2016/0280090 A1* | 9/2016 | Higashi | B60L 53/64 |
| 2017/0246962 A1 | 8/2017 | Weber et al. | |
| 2017/0276503 A1* | 9/2017 | Oh | G01C 21/3469 |
| 2018/0072181 A1* | 3/2018 | Christen | H01M 10/633 |
| 2018/0290553 A1* | 10/2018 | Malik | B60L 53/52 |
| 2019/0202305 A1 | 7/2019 | Jung et al. | |
| 2019/0263271 A1* | 8/2019 | Ashby | G06Q 10/06316 |
| 2019/0329666 A1* | 10/2019 | Kodama | B60L 53/14 |
| 2019/0351783 A1* | 11/2019 | Goei | B60L 53/68 |
| 2020/0009975 A1 | 1/2020 | Ryu et al. | |
| 2020/0276909 A1 | 9/2020 | Boisen et al. | |

* cited by examiner

| SoC req | T req | $ req |
|---------|--------|-------|
|         |        |       |
| 10%     | T1 min | $ S1  |
| 20%     | T2 min | $ S2  |
| 30%     | T3 min | $ S3  |
| 40%     | T4 mim | $ S4  |
| 50%     | T5 min | $ S5  |
| 60%     | T6 min | $ S6  |
| 70%     | T7 min | $ S7  |
| 80%     | T8 min | $ S8  |
| 90%     | T9 min | $ S9  |
| 100%    | T10 min| $ S10 |

FIGURE 3

| SoC req | T req | $ req |
|---------|--------|-------|
| 10%     | T1 min | $ S1  |
| 20%     | T2 min | $ S2  |
| 30%     | T3 min | $ S3  |
| 40%     | T1 min | $ S1  |
| 50%     | T2 min | $ S2  |
| 60%     | T3 min | $ S3  |
| 70%     | T4 min | $ S4  |
| 80%     | T5 min | $ S5  |
| 90%     | T6 min | $ S6  |
| 100%    | T7 min | $ S7  |

FIGURE 4

CHARGING SYSTEM FOR AN ELECTRIC VEHICLE

BACKGROUND OF THE INVENTION

The invention relates in general to the field of charging an electric vehicle (EV). In particular, the invention relates to use of a portable transponder for communication between EV and a charging station.

The requirement for charging differs from a person to person and depends on the usage of the EV. One person may want to spend charging time once and fully charge the battery so that he or she does not have to charge the EV battery frequently. On the other hand, another person, who does not use the EV frequently, may not want or need to charge the battery fully, so he or she may select some percentage of the battery to be charged. On the other hand when a person is near a shopping center, may have only few minutes of time and may want to charge the battery based on the availability of time. The invention describes achieving charging of EV under the three possible circumstances.

SUMMARY OF THE INVENTION

After the charging cable connector has been inserted into EV receptacle or socket, the charging control device of the e-vehicle first establishes a communication link to the charging station through cable. Upon establishing cable connection, the vehicle charging control device queries the IP address of the charging station and transmits vehicle State of Charge (SoC) information via cable. In the meantime the portable transponder transmits the transponder ID to the charging station. The transponder has transmission range over a short distance, may be 50 to 100 yards. It is noted that the portable transponder ID and transponder ID has been used interchangeably throughout the specification. The charging station transmits the charging station information along with the portable transponder ID information to an internet server. The transponder ID and one or more vehicles (or vehicle ID) are stored on the internet server. In the payment authentication or authorization process, the internet server verifies that the vehicle is registered for that portable transponder ID. Once the internet server verifies that the transponder ID is registered for the vehicle, a payment authorization is sent to the charging station. Upon receipt of confirmation, the charging station cable is locked to the EV receptacle, so that the cable cannot be withdrawn during the charging process. In case, the vehicle is not registered for transponder ID, then the internet server notifies the charging station, which in turn displays a message on the vehicle dashboard that the Payment Verification has failed and the driver is instructed to remove the cable from EV receptacle. Registering the vehicle on internet server would include information on make, model, year, etc. The transponder ID contains the billing information of the user. Once the internet server successfully verifies the transponder ID with the vehicle, the charging process can commence.

It is noted that the transponder is associated with an account, which includes the billing information such as name, address, phone number, email address etc., of the user. Further one or more vehicles could be registered for the same transponder, this allows user to change the vehicle and still use the same transponder for charging an EV. The transponder ID and associated vehicle information is stored in internet server ahead of time. In case, the transponder is lost or stolen and third party tries to use it for his or her vehicle, the server would deny the charging of EV, as the transponder ID will not match the vehicle ID, thus the owner of the transponder is protected from loss or stolen transponder. Upon successful verification of transponder ID with the vehicle, the vehicle display board displays charging options on the dash-board, the charging options includes percentage of charge, i.e. SoCreq, Treq, or $req. User or driver selects one of the options, and the charging process continues until desired selected option is met.

During the charging process, the EV and the charging station periodically exchange their SoC status, Dollar amount, and/or remaining time. Once selected SoCreq, Treq, or $req has been achieved, the charging station switches current off and releases the cable from receptacle lock. The last meter reading is conveyed over the Internet to the energy supplier for billing and the transponder holder is notified of charges.

BRIEF DESCRIPTION OF THE DRAWINGS

FIG. 3 shows selection table on vehicle dashboard.

FIG. 4 shows selection table on vehicle display, when the battery is partially charged at the start of charging.

DETAILED DESCRIPTION OF THE DRAWINGS

Figure 1:
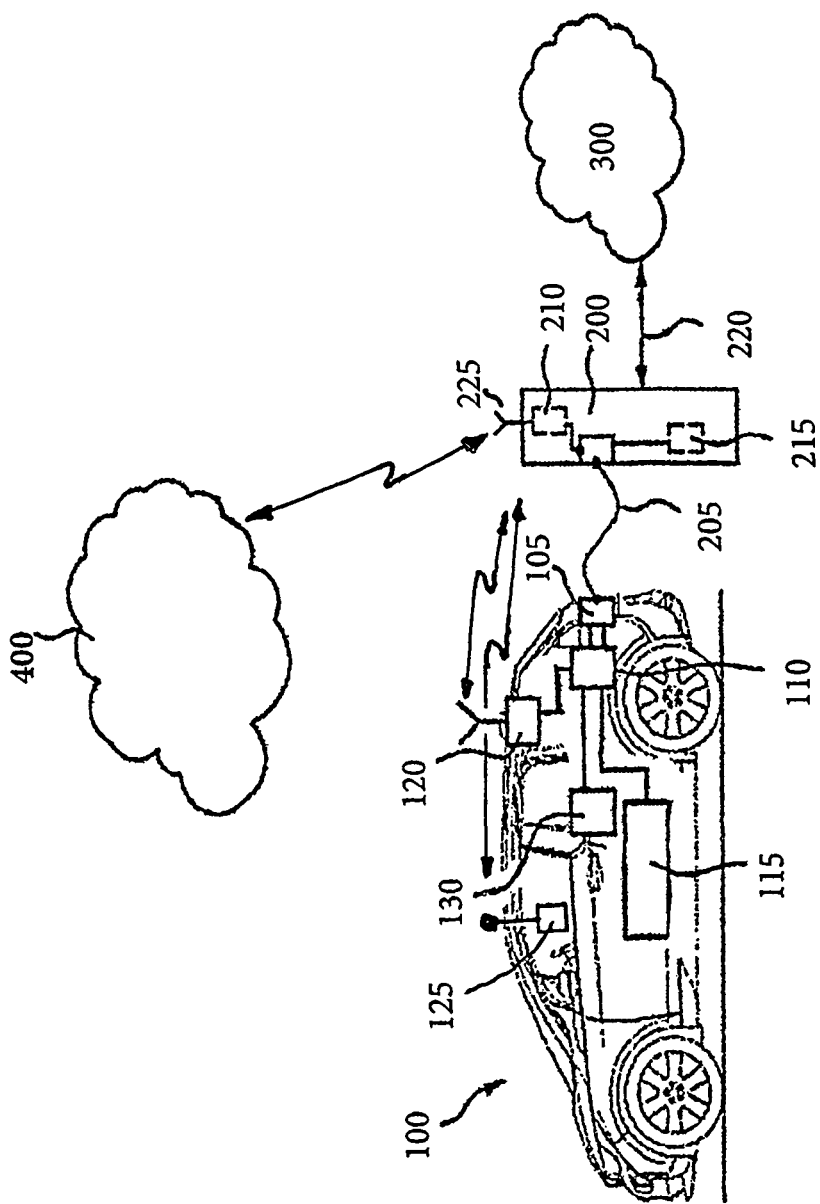
FIG. 1 illustrates an electric vehicle which is connected via a charging cable to a charging station for charging a battery of the electric vehicle, where the charging process is controlled by a charging control device in accordance with a charging profile configured by an energy management device.

FIG. 1 shows one of the electric vehicles 100 which is connected via a charging cable 205 to a charging station 200 for charging a battery 115 of the electric vehicle 100. The charging process of the battery 115 is controlled by a charging control device 110 of the electric vehicle in accordance with a charging profile configured for the electric vehicle 100. The charging station is connected to utility 300 by power supply cable 220.

After the charging cable connector is inserted into EV receptacle or socket 105, the charging control device 110 of the e-vehicle first establishes a communication link to the charging station through cable 205. Upon establishing cable connection link, the vehicle charging control device 110 queries the IP address of the charging station 200 and transmits SoC information to the charging station 200. In the meantime the portable transponder 125 transmits the transponder ID and vehicle ID to the charging station. The charging station transmits the charging station IP address along with the portable transponder ID information to an internet server 400 using data transmitter/transceiver 225. The transponder ID is registered with the internet server 400 and the transponder ID is associated with one or more vehicles. Upon request for verification from the charging station, the internet server payment authorization process which includes checking or verifying the vehicle being registered for that portable transponder ID. Once the internet server verifies that the transponder ID is registered for the vehicle, a payment authorization confirmation is sent to the charging station data transmitter 225. Upon receipt of confirmation from internet server, the charging station cable is locked to the EV receptacle, so that the cable cannot be withdrawn during the charging process.

In case the vehicle is not registered for transponder ID, then the internet server notifies the charging station, which in turn displays a message on the vehicle dashboard that the Payment Verification has failed and the driver is instructed to remove the cable from EV receptacle. Whereas, if the internet server successfully verifies the transponder ID and matches up with the vehicle, the charging process can commence.

It is noted that the transponder is associated with an account, which includes the billing information such as name, address, phone number, email address etc., of the user. Further more than one vehicles 100 could be registered for the same transponder 125, this allows user to change the vehicle and still use the same transponder for charging another EV. The transponder ID and associated vehicle information is stored in Internet server ahead of time. In case, the transponder is lost or stolen and third party tries to use it for his or her vehicle, the server would deny the charging of EV, as the transponder ID will not match the vehicle ID, thus the owner of the transponder is protected from loss or stolen transponder. Upon successful verification of transponder ID with the vehicle, the vehicle display board displays charging options on the dash-board, the charging options includes percentage of charge, i.e. SoCreq, Treq, or $req. User or driver selects one of the options, and the charging process continues until desired selected option is met.

Figure 2:
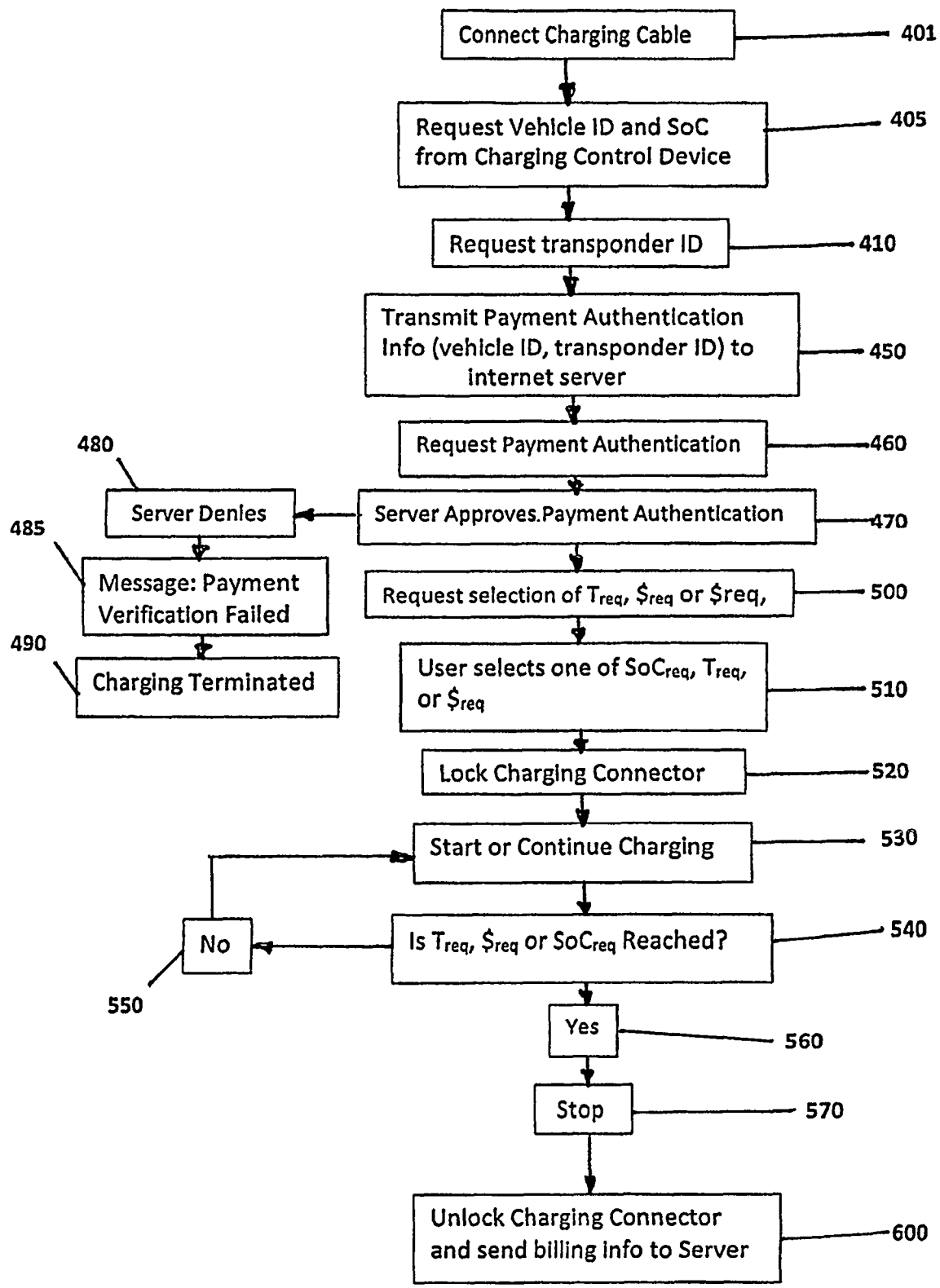
FIG. 2 shows a flow diagram for a method steps for charging a battery of an electric vehicle at a charging station.

FIG. 2, generally describes the method steps of charging process. At step 401, the charging cable 205 is connected to the receptacle 105 of EV 100. At step 405, the charging station 200 requests the EV ID and SoC. At step 410, the charging station requests transponder ID. After receiving the EV ID and SoC information. At step 450, the charging station data transmitter 225 transmits the transponder ID, along with vehicle ID, charging station ID to the internet server 400 and at step 460, the charging station requests payment authentication. At step 470, the Internet server verifies the transponder ID and matches up with the vehicle ID stored in the database, and if the vehicle is registered to the transponder ID internet server approves the payment authorization. If the vehicle is not registered to the transponder ID, then at step 480, the internet server denies the 'payment authentication' request, and upon receipt of denial, at step 485, the charging station sends the signal to the vehicle data transmitter device to display 'Payment Verification failed' and at step 490, the charging is terminated and the user is requested to remove the cable from the EV socket. Coming back to step 470, where the payment authentication or charging authorization is approved, at step 500 the data transmitter requests the vehicle energy management device 130, to select one of the three parameters i.e. SoC req, Treq or $req. At step 510, upon user selecting one of three parameters, the charging connector is locked at step 520, and the charging commences at step 530. At the same time, the charging station energy management device 215 starts the clock for measuring time, and also computes the dollar amount of energy transmitted to the vehicle. The energy measuring unit 210 measures electricity consumed. Further, the energy management device 130 periodically measures the status of SoC and transmits the information to charging station energy management device 215 via data transmitter device 120. At step 540, once the selected parameter is reached at step 560, the charging is stopped at step 570 and at step 600 the charging connector is unlocked from the vehicle socket. The charging station also transfers the dollar amount of energy provided to the server for billing to the user. Though not shown in FIG. 2, in case the charging connector is manually unlocked from the socket, the charging is automatically terminated.

FIGS. 3 and 4 generally describes selection process for the charging. If the SoC of the battery is less than 10%, then the first energy management device 130 displays information contained in FIG. 3. FIG. 3, contains first column related to SoC of the battery, generally SoC will be displayed in the increment of 10%, however, any other percentage increment could be displayed. The second column displays the amount of time (T1 through T10) that will be required to achieve corresponding SoC percentage level of charge in the first column. In the same manner the third column displays the cost ($S1 through $S10) that will be required to achieve corresponding SoC percentage level of charge in the first column. FIG. 4, shows the scenario where some level of charge is remaining. In the example shown, the SoC of the battery is 30%, however this number could be any number. In such cases, the energy management device, based on the charging profile of the EV, calculates the time and $ amount required to achieve the SoC percentages in the first column and displays it as shown in FIG. 4.

As discussed earlier, depending upon the intent of the user and the time availability, the user selects the percentage of SoC (SoC req), time (T req) of dollar amount ($ req). Only one of three parameters has to be selected. If user selects the percentage of SoC, then the first energy management device 130 targets the upper value for SoC from the current SoC value and once the selected parameter is achieved, the charging is automatically stopped. In the same manner, the user can select Time or the dollar amount, and once the selected value of Time or dollar amount is reached, the charging is automatically stopped. It is apparent that the selected value of time or dollar amount does not have to correspond to 100% of SoC.

INDEX OF NUMERALS

100—Electric Vehicle (EV)
105—Socket
110—Charging Control Device
115—Battery
120—Data transmission Device
125—Portable Transponder
130—First Energy Management Device
200—Charging Station
205—Cable
210—Energy Measuring Unit
215—Second Energy Management Device
220—Power Supply
225—Data Transmitter
300—Utility
400—Internet Server

The invention claimed is:

1. An electric Vehicle (EV) charging system comprising,
an electric vehicle (100) comprising a battery (115), a data transmission device (120), a charging control device (110), a portable transponder (125), a first energy management device (130), and a socket (105) connectable to a charging station (200) by a cable (205);
the charging station comprising an energy measuring unit (210), a second energy management device (215), and a data transmitter (225), the charging station being connected to a utility (300) by a power supply (220);
wherein upon connecting the cable to the socket of the electric vehicle, the charging station requests state of charge (SoC), vehicle identification and portable transponder identification for obtaining payment authorization from an internet server (400), wherein the charging control device transfers the SoC information to the charging station via said cable, and the portable transponder transfers the vehicle identification and transponder identification information to the charging station via said data transmission device, the data transmitter of the charging station transfers the charging station identification, the vehicle identification, and transponder identification information to the internet server (400), and the charging station requests authorization to commence charging the EV, the internet server verifies that the transponder identification information matches with the vehicle identification, and transmits the authorization to the charging station, and upon receipt of the authorization from the internet server, the charging station commences charging of the EV.

2. The electric Vehicle (EV) charging system according to claim 1, further comprising: upon receipt of the authorization from the internet server, the cable is locked to the vehicle socket of the EV.

3. The electric Vehicle (EV) charging system according to claim 1, further comprising: upon failure of matching of the vehicle identification with the transponder identification by the internet server (400), and the internet server transmits 'payment verification failed' message to the data transmission device of the vehicle.

4. A method of charging an electric Vehicle (EV) comprising, providing an electric vehicle (100) comprising a battery (115), a data transmission device (120), a charging control device (110), a portable transponder (125), a first energy management device (130), and a socket (105) connectable to a charging station (200) by a cable (205);

providing the charging station comprising an energy measuring unit (210), a second energy management device (215), and a data transmitter (225), the charging station being connected to a utility (300) by a power supply (220);

connecting the cable to the socket of the electric vehicle, requesting state of charge (SoC), vehicle identification and portable transponder identification for obtaining payment authorization from an internet server (400), transferring SoC information to the charging control device of the electric vehicle to the charging station via said cable, providing charging station identification, vehicle identification and transponder identification information to the charging station via said data transmission device, transmitting the vehicle identification and transponder identification information to the internet server (400), and requesting authorization to commence charging the EV, verifying the transponder identification information with the vehicle identification from the server database and transmitting the authorization to the charging station, and upon receipt of the authorization from the internet server, requesting user to select one of the parameters for charging the EV.

5. The method of charging an electric Vehicle (EV) according to claim 4, further comprises:

the selection of one of the parameters includes selection from % SoC, Time, and Dollar amount.

6. The method of charging an electric Vehicle (EV) according to claim 5, upon battery SoC reaching corresponding one of the selected parameter, the charging is stopped and billing information is sent to the server.

* * * * *